May 12, 1959 M. A. CLEMENT 2,886,660

INTERTOLL TEST SERVICE TRUNKS

Filed Nov. 30, 1954 3 Sheets-Sheet 1

INVENTOR.
MILTON A. CLEMENT
BY T. L. Bowes
ATTORNEY

May 12, 1959 M. A. CLEMENT 2,886,660

INTERTOLL TEST SERVICE TRUNKS

Filed Nov. 30, 1954 3 Sheets-Sheet 2

May 12, 1959 M. A. CLEMENT 2,886,660

INTERTOLL TEST SERVICE TRUNKS

Filed Nov. 30, 1954 3 Sheets-Sheet 3

United States Patent Office 2,886,660

Patented May 12, 1959

2,886,660

INTERTOLL TEST SERVICE TRUNKS

Milton A. Clement, Rochester, N.Y., assignor, by mesne assignments, to General Dynamics Corporation, a corporation of Delaware Application November 30, 1954, Serial No. 472,159

5 Claims. (Cl. 179—175)

This invention relates to automatic telephone systems, and more particularly to intertoll test service trunks for use in automatic telephone systems.

In intertoll telephone systems, it is frequently desired to enable a serviceman or test operator to make certain tests on intertoll trunk lines. One system for performing such service comprises the application of a calibrated level of signal to a line to be tested, whereby the service or test man can determine by suitable measuring instruments the transmission loss between the place of application of the test signal and the place at which the line is measured.

It is an object of my invention to provide a new and improved test trunk circuit.

In accordance with my invention, there is provided an intertoll service trunk which functions in association with a calibrated tone oscillator which, in the preferred form of my invention, is designed to operate at 1,000 cycles, 1 milliwatt, and to apply the output of this oscillator to the intertoll connection under test for a period of predetermined length. During the test period, all bridging is removed from the tip and ring conductors. On-hook supervision is provided at the end of the tone period. My circuit is arranged so that it can be released and immediately made idle at any time during the tone period upon release of the intertoll trunk by way of a suitable conductor extending between the test position and the intertoll trunk. Means is provided for reapplying the tone after a completed period by sending a single pulse.

Further objects and advantages of my invention will become apparent as the following description proceeds and the features of novelty which characterize my invention will be pointed out with particularity in the claims annexed to and forming a part of this specification.

Figure 1:
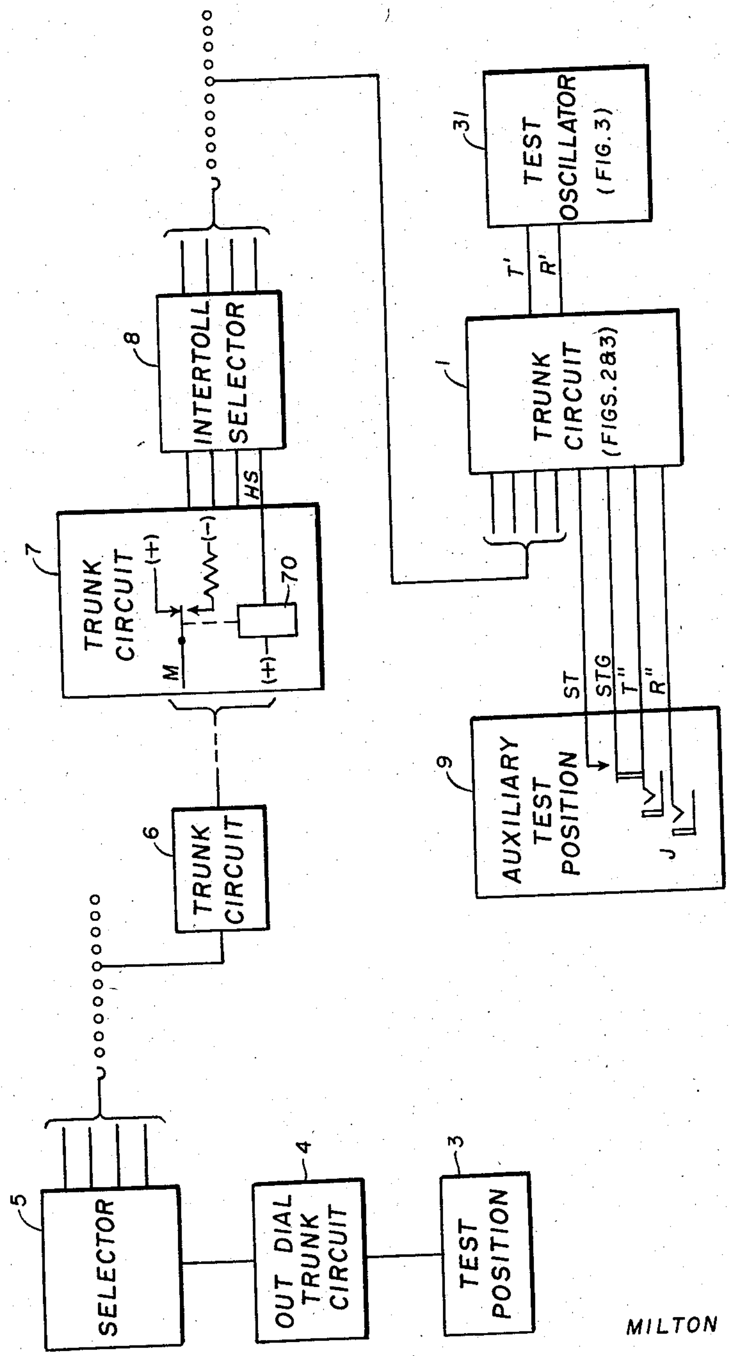
Figure 2:
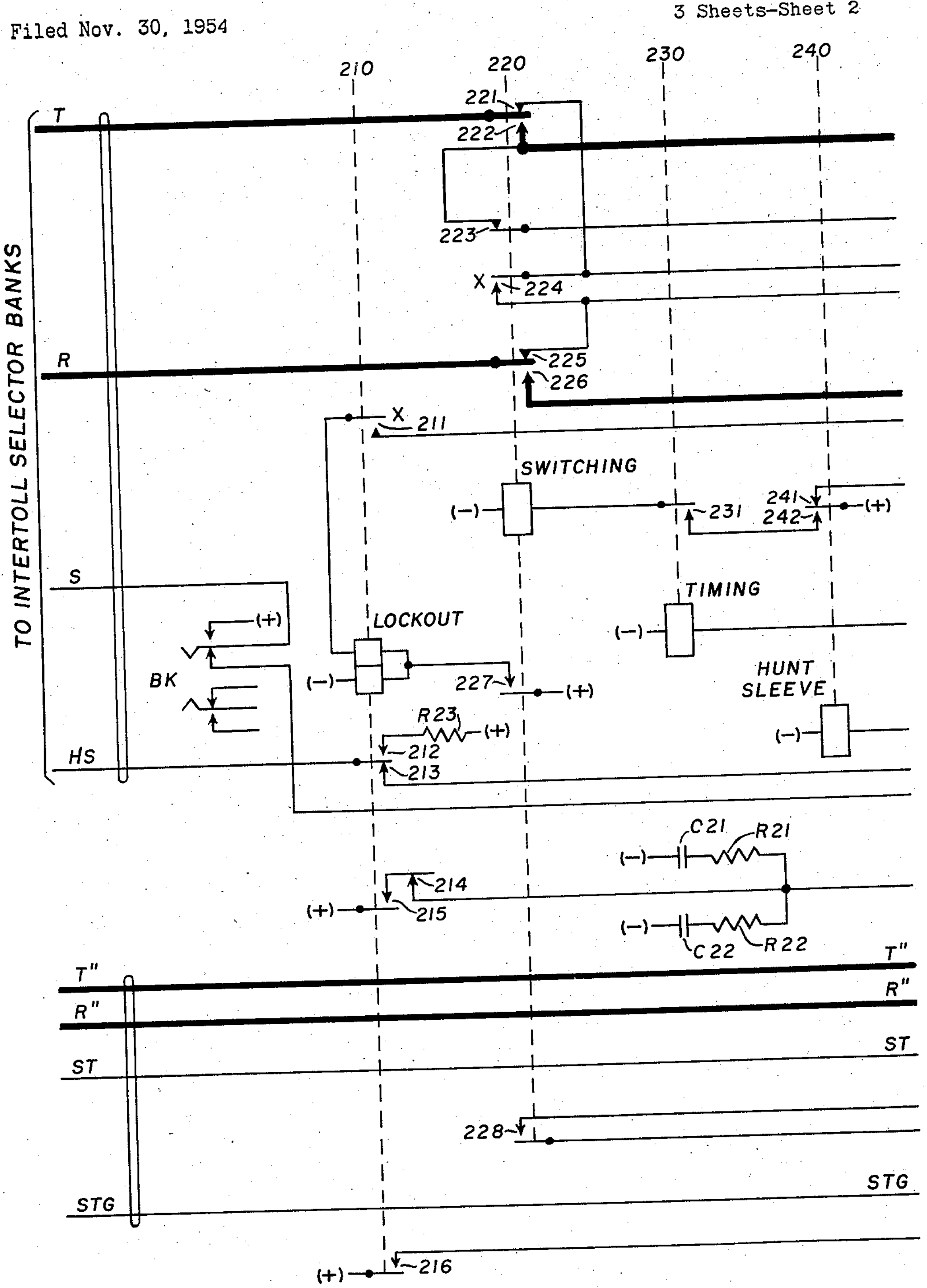
Figure 3:
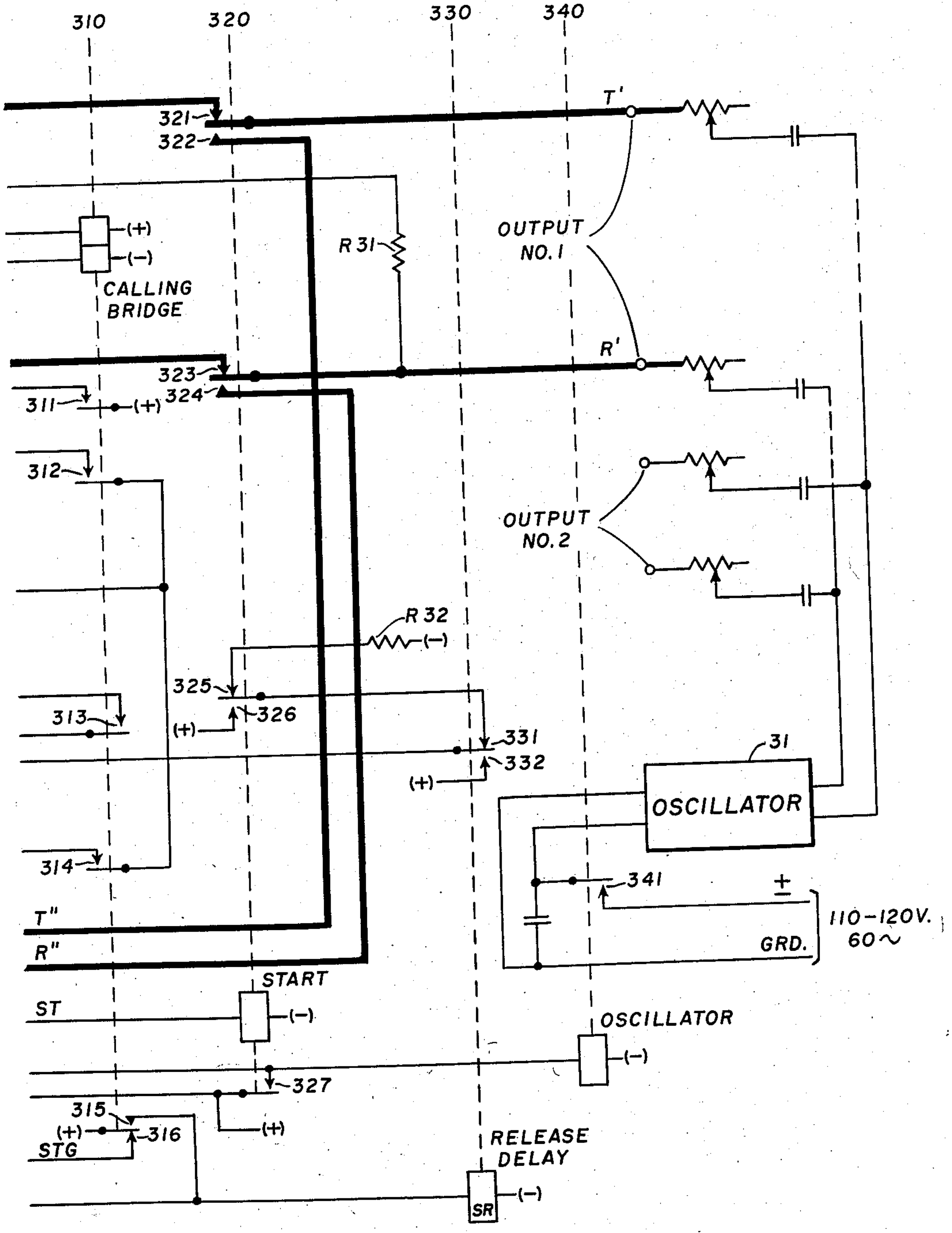

For a better understanding of my invention, reference may be had to the accompanying drawing in which:

Fig. 1 is a block diagram illustrating a telephone system embodying the principles of my invention; and Figs. 2 and 3 illustrate a trunk circuit and test oscillator connections for use in the system of Fig. 1.

My invention is particularly applicable to trunk circuit 1 of Fig. 1 to which is connected a suitable test oscillator 31. Access to trunk circuit 1 from test position 3 may be provided through an out-dial trunk circuit 4, selector 5, trunk circuits 6 and 7, and intertoll selector 8. Selectors 5 and 8 may be caused to advance to enable seizure of trunk circuit 1 in any suitable manner as by means of suitable switches directed by a suitable dial at test position 3. Access to trunk circuit 1 may also be accomplished from auxiliary test position 9.

Reference may be had to Figs. 2 and 3 for a detailed description of the operation of trunk circuit 1.

In order to initiate the test, the operator or test man at position 3 seizes trunk circuit 1 in the manner generally described above, which effects the seizure of calling bridge relay 310 over a circuit extending from ground (represented by the symbol (+)) through the upper winding of relay 310, normal contacts 221, tip lead T, calling loop, ring lead R, normal contacts 225, and the lower winding of the calling bridge relay 310 to battery (indicated by the symbol (—)).

In response to the operation of relay 310, a circuit is completed for operating release delay relay 330 through operated contacts 315; a circuit is completed for operating hunt sleeve relay 240 over a circuit extending from battery through the winding of relay 240, operated contacts 313, normal contacts 213, hunt sleeve lead HS extending back through intertoll selector 8 to trunk circuit 7 and through the upper winding of relay 70 to ground, whereupon relays 70 and 240 operate in series; a circuit is prepared for operating lockout relay 210 at operated contacts 311; a circuit is completed for operating relay 230 by way of normal contacts 241 and operated contacts 312; and the R-C timing network comprising capacitors C21 and C22 and resistors R21 and R22 are connected between battery and ground by way of normal contacts 241 and operated contacts 312 and 314.

During the operate time of relay 240, relay 230 operates over the previously described circuit and capacitors C21 and C22 are charged, the charging period ending upon the opening of contacts 241.

The sleeve lead S, up until this time, has been connected to resistance battery in order to enable seizure from the preceding switch train, this circuit extending from sleeve lead S through normal contacts of busy key BK, normal contacts 331 and 325, and resistor R32 to battery. Upon the operation of relay 330, the sleeve lead S is switched at operated contacts 332 to direct ground whereby the circuit is busied in the intertoll selector bank.

In response to the operation of relay 240, the energizing circuit for relay 230 and the charging circuit for capacitors C21 and C22 are interrupted at contacts 241. The operation of relay 240 also completes a circuit for operating switching relay 220 by way of operated contacts 242 and 231.

Relay 230 is maintained operated during the discharge time of capacitors C21 and C22 by the charge on these capacitors.

In response to the operation of switching relay 220, tip lead T′ and ring lead R′ extending to a suitable source of test signal such as test oscillator 31 are connected to tip lead T and ring lead R respectively through operated contacts 222 and normal contacts 321, and operated contacts 226 and normal contacts 323, respectively. Relay 310 is now disconnected from leads T and R but this relay is held operated through preliminary-make contacts 224 which close to complete a holding circuit for relay 310 prior to the opening of energizing contacts 221 and 225. Also in response to the operation of relay 220, a circuit is completed for energizing oscillator control relay 340 over a circuit extending from battery through the winding of relay 340 and operated contacts 228 to ground to energize oscillator 31 through operated contacts 341 which results in the application of a suitable tone to leads T′ and R′; opens the 600 ohm termination across the oscillator output leads T′ and R′ at contacts 223; and connects ground through operated contacts 227 to both windings of lockout relay 210, which results in the operation of two-step relay 210 to its first position whereupon preliminary make contacts 211 are operated to connect the left-hand terminal of the upper winding of relay 210 to ground through operated contacts 311. With this arrangement, the upper winding of relay 210 is shunted and under the shunt conditions relay 210 is prevented from fully operating. It will be noted that relay 310 and termination R31 have been disconnected from leads T and R; hence, all bridging across leads T and R has been removed and nothing remains in the circuit to absorb energy from the oscillator output signal.

With the foregoing arrangement, oscillator tone is applied to leads T and R during a predetermined interval of time during which the operator or test man at position 3 may make desired tests on the extended connection. The timing period depends on the time constant of the R-C network previously identified. This network comprises two branches, the first branch comprising capacitor C21 connected in series with resistor R21 and the second branch comprising series-connected capacitor C22 and resistor R22. In one embodiment of my invention, the values of capacitance and resistance of this network have been chosen to hold relay 230 operated for a 15 second period. When capacitors C21 and C22 discharge to a sufficient degree, relay 230 releases.

In response to the release of relay 230, switching relay 220 is de-energized at contacts 231.

In response to the release of relay 220, contacts 222 and 226 open to remove the oscillator output from leads T and R, and the calling bridge relay 310 is reconnected to leads T and R by way of normal contacts 221 and 225, respectively, thereby holding relay 310 operated.

The release of relay 220 also removes shunting ground from the upper right terminal of relay 210, whereupon relay 210 operates from battery through both windings in series, and operated contacts 211 and 311 to ground.

In response to the operation of relay 210 to its second step or position, resistance battery is applied to lead HS by way of operated contacts 212 and resister R23 in order to provide on-hook supervision at test position 3. This supervision may be furnished in any desired way. For illustrative purposes, it may be noted that the application of resistance ground to lead HS may shunt out relay 70, in trunk 7 (Fig. 1) which releases to connect ground to the M lead extending toward the test position from trunk 7. This ground potential can be used to energize a suitable signal at test position 3.

Also in response to the operation of relay 210, capacitors C21 and C22 are recharged through operated contacts 215 and normal contacts 214 during the operate time of relay 210, because contacts 214 and 215 are arranged to overlap in their contact making positions. The release delay relay is held operated from ground by way of operated contacts 216.

The tester at position 3 may have completed making his tests prior to the end of the timing cycle. Means are provided for enabling him to release the circuit of Figs. 2 and 3. For example, the tester may pulse the lead HS by means of a dial pulse or by pulling a plug at position 3 which effects the release of hunt sleeve relay 240. The release of relay 240, of course, de-energizes switching relay 220 to remove the oscillator tone.

If the operator or test man wishes to repeat the test at the end of the 15 second interval, he first releases calling bridge relay 310 and lockout relay 210 by opening the calling loop, thereby releasing the trunk. As soon as relay 210 releases, the trunk may be re-seized by closing the calling loop over leads T and R and re-energizing calling bridge relay 310.

If the operator or test man at position 3 wishes to start recycling of the trunk circuit before restoration of his receiver, he may dial over the incoming loop including leads T and R in order to drop relay 310, provided that relay 210 has not yet fully operated. The release of relay 310 effects the release of relay 240 at contacts 313 which in turn releases switching relay 220 at contacts 242. When relay 310 re-energizes the sequence of operations is repeated.

The circuit of Figs. 2 and 3 is also arranged to enable the use of a single oscillator to serve both intertoll trunk tests and connection between an auxiliary test position 9 directly without the intervention of the switch train shown in Fig. 1. Test position 9 is provided with jack J. When a plug is inserted in jack J, start relay 320 is energized from ground through normal contacts 316, lead STG to position 9, operated contacts of jack J, lead ST to trunk circuit 1 and the winding of relay 320 to battery. The operation of relay 320 completes a circuit for energizing oscillator start relay 340 by way of operated contacts 327; a circuit is completed for grounding the back sleeve lead S through normal contacts 331 and operated contacts 326; and oscillator output lead T' and R' are connected to leads T'' and R'' extending to auxiliary test position 9 through operated contacts 322 and 324, respectively.

While I have shown and described my invention as applied to a specific embodiment thereof, other modifications will readily occur to those skilled in the art. I do not, therefore, desire my invention to be limited to the specific arrangement shown and described, and I intend in the appended claims to cover all modifications within the spirit and scope of my invention.

What I claim is:

1. In a telephone system a trunk circuit, a test position, a pair of conductors, means for extending a connection from said position to said trunk circuit over said pair of conductors, a relay, means responsive to the extension of said connection to said trunk circuit for energizing said relay over said conductors, means responsive to the operation of said relay for disconnecting said relay from said pair of conductors, and circuit means for maintaining said relay energized while disconnected from said conductors.

2. In a telephone system a trunk circuit, a test position, a pair of conductors, a source of test signal, means for extending a connection from said position to said trunk circuit over said pair of conductors, a relay, means responsive to the extension of said connection to said trunk circuit for energizing said relay over said conductors, means responsive to the operation of said relay for disconnecting said relay from said pair of conductors and for connecting said signal source to said conductors, and circuit means for maintaining said relay energized while disconnected from said conductors.

3. In a telephone system a trunk circuit, a test position; a pair of conductors; a source of test signal; means for extending a connection from said position to said trunk circuit over said pair of conductors; a switching relay having a pair of break contacts, a pair of make contacts, and a set of auxiliary make contacts, said auxiliary contacts being arranged to engage before said make contacts close and said break contacts open when said switching relay operates and to remain closed until said make contacts open and said break contacts close during the release of said switching relay; a calling bridge relay; means responsive to the extension of said connection to said trunk circuit for energizing said calling bridge relay through said break contacts; means responsive to the energization of said calling bridge relay for effecting the operation of said switching relay; means responsive to the operation of said switching relay for disconnecting said calling bridge relay from said pair of conductors at said break contacts and for connecting said signal source to said conductors through said make contacts; and circuit means utilizing said auxiliary contacts for maintaining said calling bridge relay energized while disconnected from said conductors, thereby holding said trunk circuit.

4. The telephone system of claim 3 including an additional set of break contacts on said switching relay; an impedance, said additional break contacts and said impedance constituting a termination connected across the output of said signal source whereby the operation of said switching relay also disconnects the terminating impedance from said output.

5. In a telephone system a trunk circuit, a test position, a pair of conductors, means for extending a connection from said position to said trunk circuit over said pair of conductors, a relay, means responsive to the extension of said connection to said trunk circuit for energizing said relay over said conductors, timing means, means responsive to the operation of said relay for energizing said timing means to initiate a timing cycle and for disconnecting said relay from said pair of conductors, and circuit means including said timing means for maintaining said relay energized during the timing cycle and while disconnected from said conductors.

No references cited.